United States Patent Office 3,372,210
Patented Mar. 5, 1968

3,372,210
O,O-DILOWERALKYLPHOSPHORODITHIOMETH-YL-(POLY) CHLOROPHENOXYACETATES
Arnold D. Gutman, Oakland, and Thomas L. Snell, Hayward, Calif., assignors to Stauffer Chemical Company, New York, N.Y., a corporation of Delaware
No Drawing. Filed Sept. 23, 1964, Ser. No. 398,762
5 Claims. (Cl. 260—951)

ABSTRACT OF THE DISCLOSURE

Compounds having the general formula:

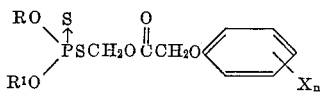

wherein R and $R^1$ are lower alkyl, X is selected from the group consisting of hydrogen and halogen, preferably chlorine, and $n$ is an integer from 1 to 5, inclusive. The compounds are particularly effective as herbicides in the control of grasses and broadleaf plants with both pre-emergence and post-emergence activity. Typical compounds are O,O - dimethyl - phosphorodithioylmethyl-p-chlorophenoxyacetate, O,O - dimethylphosphorodithioylmethyl-2,4,5-trichlorophenoxyacetate and O,O - diisopropylphosphorodithioylmethyl-p-chlorophenoxyacetate.

---

This invention relates to certain new and novel organic compounds which may be used as herbicides. More specifically, this invention relates to certain substituted phenoxydithioylphosphate esters and to the utility of such compounds in herbicidal compositions.

The invention relates to compounds of the general formula:

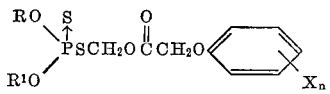

wherein R and $R^1$ are lower alkyl, X is selected from the group consisting of hydrogen, halogen, especially chlorine and combinations thereof, $n$ is an integer from 1 to 5, inclusive. The halogen substitution may be singular or plural up to five halogen atoms.

It has been found that the compounds of the present invention are particularly effective as herbicides. They are effective in the control of grasses and broadleaf plants with both pre-emergence and post-emergence activity.

The compounds of the present invention may be used in accordance with the following non-limiting example.

EXAMPLE 1

*Preparation of O,O-dimethylphosphorodithioylmethyl-p-chlorophenoxyacetate.*—A 500 ml. round-bottom flask was equipped with a stirrer, thermometer, and dropping funnel. In the flask, 9.4 g. (0.05 mole) hydroxymethyl-O,O-dimethylphosphorodithioate, 10.3 g. (0.05 mole) parachlorophenoxyacetyl chloride and 150 ml. of benzene were combined. The mixture was cooled to 0° C. in an ice-bath and 3.9 g. (0.05 mole) of pyridine was added drop-wise into the stirred solution at such a rate that the temperature was maintained below 10° C. After the addition was completed, the mixture was washed with two 100 ml. portions of water, dried over anhydrous magnesium sulfate, and the benzene evaporated on a steam bath. There was obtained 15.1 g. (84.5% of theory) of O,O-dimethylphosphorodithioylmethyl - p - chlorophenoxyacetate, a semi-solid.

The following is a table of the compounds prepared according to the aforedescribed procedure. Compound numbers have been assigned to each compound and are used throughout the balance of the application.

TABLE I

| Compound | R | $R^1$ | $X_n$ |
|---|---|---|---|
| 1* | $CH_3$ | $CH_3$ | 4-Cl |
| 2 | $CH_3$ | $CH_3$ | 2,4-di-Cl |
| 3 | $CH_3$ | $CH_3$ | 2,4,5-tri-Cl |
| 4 | $i-C_3H_7$ | $i-C_3H_7$ | 4-Cl |

*No. 1 prepared in the example.

As previously mentioned, the herein described novel compositions produced in the above described manner are phytotoxic compounds which are useful and valuable in controlling various plant species. The compounds of this invention were tested as herbicides in the following manner.

*Pre-emergence herbicide test.*—The seeds of crab grass, annular bluegrass, watergrass, red oats, pigweed, Indian mustard and curled dock were planted in individual rows one-half inch deep in Santa Cruz sandy loam soil contained in compressed paper flats. Enough seeds were planted to give about thirty to fifty plants each of the weed species in each flat. The flats were watered after planting. The following day each flat was sprayed at the rate of 20 pounds of the candidate compound under test in 80 gallons of solution per acre. An atomizer was used to spray the solution on the soil surface. Two weeks later the degree of weed control was determined by comparing the amount of germination and growth of each weed in the treated flats with weeds in several untreated control flats. The results of this test are reported in Table II.

TABLE II.—PRE-EMERGENCE ACTIVITY RATE 20 LBS./A.

| Compound Number | Crab grass | Annual bluegrass | Water grass | Red oats | Pigweed | Indian mustard | Curled dock |
|---|---|---|---|---|---|---|---|
| 1 | +++ | +++ | +++ | +++ | +++ | +++ | +++ |
| 2 | +++ | + | +++ | +++ | +++ | +++ | +++ |
| 3 | +++ | | +++ | +++ | +++ | +++ | +++ |
| 4 | +++ | +++ | +++ | +++ | +++ | +++ | +++ |

+++ =severe injury or death.
++ =moderate injury.
+ =slight injury.

Upon further evaluation compounds 1, 2 and 4 of the present invention were found to control lamb's quarter, pigweed and mustard at 90 to 100 percent level at 2 pounds per acre application. Good control, 70 to 85 percent, was also found by compounds 1 and 4 for crab grass, foxtail and curled dock at 2 pounds per acre.

*Post-emergence herbicide test.*—The seeds of crab grass, watergrass, red oats, Indian mustard, curled dock and pinto bean were planted in individual rows in Santa Cruz sandy loam soil as described in the pre-emergence test, supra. After growing for two weeks under greenhouse conditions the plants were four to six inches tall. Thereafter, the candidate test compound was applied to the foliage by means of an overhead spray while the flat moved under the spray on a moving table. A concentration of 0.5% of active compound in the spray was used at a rate equivalent to approximately 60 lbs./acre. Two weeks after treatment the injury results were recorded using a similar rating system as used in the pre-emergence test. Table III lists the results obtained therefrom.

TABLE III.—POST-EMERGENCE ACTIVITY RATE 60 LBS./A.

| Compound Number | Crab grass | Water grass | Red oats | Indian mustard | Curled dock | Pinto bean |
|---|---|---|---|---|---|---|
| 1 | +++ | +++ | + | +++ | +++ | +++ |
| 2 | +++ | +++ | + | +++ | +++ | +++ |
| 3 | +++ | +++ | + | +++ | +++ | +++ |
| 4 | +++ | +++ | + | +++ | +++ | +++ |

+++ = severe injury or death.
++ = moderate injury.
+ = slight injury.

The compounds of the present invention were found to give excellent control, 85 to 100 percent, at the application rate of 2 pounds per acre for lamb's quarter, pigweed, mustard and curled dock.

The compounds of the present invention find particular utility as pre-emergence or post-emergence herbicides and may be applied in a variety of ways at various concentrations. They may be combined with suitable carriers and applied as dusts, sprays or drenches. The amount applied will depend upon the nature of the weeds or plants to be controlled and the rate of application may vary from 1 to 80 pounds per acre. One particularly advantageous way of applying the compounds is as a narrow band along a row crop, straddling the row.

Various changes and modifications may be made without departing from the spirit and scope of the invention described herein as will be apparent to those skilled in the art to which it pertains. It is accordingly intended that the present invention shall only be limited by the scope of the appended claims.

We claim:
1. Composition of matter corresponding to the formula:

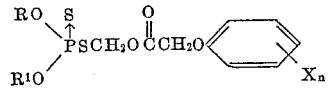

wherein R and R¹ are lower alkyl, X is chlorine and $n$ is an integer from 1 to 5 inclusive.

2. The compound, O,O-dimethylphosphorodithioyl methyl-p-chlorophenoxyacetate.
3. The compound, O,O-dimethylphosphorodithioyl-methyl-2,4-dichlorophenoxyacetate.
4. The compound, O,O-dimethylphosphorodithioyl-methyl-2,4,5-trichlorophenoxyacetate.
5. The compound, O,O-diisopropylphosphorodithioylmethyl-p-chlorophenoxyacetate.

References Cited

UNITED STATES PATENTS 3,168,436  2/1965  Chupp _____ 260—952 X

CHARLES B. PARKER, *Primary Examiner.*

B. BILLIAN, A. H. SUTTO, *Assistant Examiners.*